US007455744B2

(12) United States Patent
Mileti et al.

(10) Patent No.: US 7,455,744 B2
(45) Date of Patent: Nov. 25, 2008

(54) INFLATABLE MATTRESS SYSTEMS AND METHOD OF MANUFACTURE THEREOF

(75) Inventors: Robert Mileti, Torrington, CT (US); Stephen M. Fisher, Sherman, CT (US)

(73) Assignee: Trlby Innovative LLC, Torrington, CT (US)

( * ) Notice: Subject to any disclaimer, the term of this patent is extended or adjusted under 35 U.S.C. 154(b) by 798 days.

(21) Appl. No.: 10/919,858

(22) Filed: Aug. 17, 2004

(65) Prior Publication Data

US 2007/0226912 A1 Oct. 4, 2007

Related U.S. Application Data

(62) Division of application No. 09/563,995, filed on May 3, 2000, now Pat. No. 6,775,868.

(51) Int. Cl.
*B32B 37/00* (2006.01)

(52) U.S. Cl. .................. 156/145; 156/308.4; 156/309.6

(58) Field of Classification Search ..................... 5/710, 5/714, 713; 156/145, 308.4, 309.6
See application file for complete search history.

(56) References Cited

U.S. PATENT DOCUMENTS 2,604,641 A 7/1952 Reed
2,703,770 A * 3/1955 Melzer .......................... 5/710
3,772,717 A 11/1973 Yuen et al.
3,822,425 A 7/1974 Scales
4,185,341 A 1/1980 Scales
4,371,999 A 2/1983 Reid
4,422,194 A 12/1983 Viesturs et al.
4,541,135 A 9/1985 Karpov
4,896,389 A 1/1990 Chamberland
4,908,895 A 3/1990 Walker
4,991,244 A 2/1991 Walker
4,999,074 A 3/1991 Afeyan
5,044,030 A 9/1991 Balaton
5,168,589 A 12/1992 Stroh et al.
5,421,044 A 6/1995 Steensen
5,560,056 A 10/1996 Tai
5,596,781 A * 1/1997 Graebe .......................... 5/710
5,720,061 A 2/1998 Giori et al.
5,727,270 A 3/1998 Cope et al.
5,729,853 A 3/1998 Thompson
5,755,000 A 5/1998 Thompson
5,890,245 A 4/1999 Klearman et al.
5,956,787 A 9/1999 James et al.
6,240,584 B1 6/2001 Perez et al.

FOREIGN PATENT DOCUMENTS

DE 297 17 204 10/1998
FR 2601874 A * 1/1988
GB 2 267 217 12/1993
WO WO 95/31920 11/1995

* cited by examiner

*Primary Examiner*—Jeff H Aftergut
(74) *Attorney, Agent, or Firm*—St. Onge Steward Johnston & Reens LLC

(57) ABSTRACT

An air mattress system is provided wherein longitudinal air supply tubes supply air to alternating laterally extending cross support tubes that extend between two longitudinal side rails. The side rails remain inflated despite failure of the pump or ruptures of the lateral support tubes. The structure of the air mattress is such that it can be produced as a continuous rolled product. A method for making the individual mattress of this construction is also set forth.

18 Claims, 7 Drawing Sheets

INFLATABLE MATTRESS SYSTEMS AND METHOD OF MANUFACTURE THEREOF

CROSS REFERENCE TO RELATED APPLICATIONS

This application is a divisional of U.S. patent application Ser. No. 09/563,995 filed May 3, 2000, which application is now U.S. Pat. No. 6,775,868.

FIELD OF THE INVENTION

This invention relates to inflatable devices for supporting a body. The invention is especially applicable in the field of disposable inflatable mattresses, mattress overlays, seat cushions, and back supports, particularly those used for homecare, long-term care and hospital use.

DESCRIPTION OF THE PRIOR ART

Inflatable mattresses for people to lie or sleep on are well known in the prior art.

Generally speaking, such mattresses and cushions, when used for medical applications, are used by immobilized patients. Various types of these mattresses purport to provide a reduced pressure on the body and/or relieve pressure in specific zones or on specific parts of the body. The materials of manufacture of these mattresses generally do not allow water vapor produced by the person's perspiration or condensation to escape from the vicinity of his body, thus requiring an additional item to be placed between the patient and the support surface.

In addition, inflatable mattresses of the prior art are generally configured so that their construction requires a large amount of labor, usually because the formation of individual air chambers that make up the entire mattress need to be connected in a way that allows the chambers to be filled with air at the time of inflation, and at the same time must be placed and configured to provide suitable support to the user. The prior art designs require a time consuming assembly and mechanical joining of material to make the mattress, and this labor intensive construction of the air mattresses makes the air mattresses expensive, and consequently unsuitable for disposable mattress applications, such as in a hospital environment where the mattress may be contaminated by contact with a patient.

It is also a problem in the prior art that if there is a rupture or loss of pressure in an inflatable mattress, the entire mattress will collapse. The result may be that, for instance, in a hospital bed, a patient might roll off the underlying bed or mattress system, or be dropped onto an uncomfortable surface below the deflated air mattress.

SUMMARY OF THE INVENTION

It is therefore an object of the present invention to provide an inflatable mattress system which has an outer layer which permits the passage of water vapor but not fluid through it, overlying and working in conjunction with a fill or batting layer which rests on an inflatable mattress underneath. The outer layer is preferably attached to the inflatable mattress as is the fill layer.

It is also an object of the present invention to provide for an inflatable air mattress of a construction such that it can be readily manufactured without undue amounts of human labor. This is accomplished by providing a mattress construction which allows for continuous formation of the mattresses as a continuous rolled out product so that each individual mattress is formed by cutting the rolled stock, and then finished with a minimum amount of additional sealing. It is also an object of the present invention to provide a method of efficient manufacture of the mattresses from continuously rolled stock.

It is further an object of the present invention to provide for an inflatable air mattress having two lateral side rail tubes which do not deflate once inflated, even if the central portion of the mattress loses air pressure.

It is also an object of the present invention to provide an air mattress wherein, even if the central portion below the patient is punctured or loses pressure, a lower set of chambers of the air mattress nonetheless remain inflated and prevent the patient dropping onto the surface of a bed, a bedspring, or another mattress below the air mattress.

It is also an object of the present invention to provide a mattress having a series of laterally extending support tubes so that adjoining supply tubes can be alternately inflated and deflated, alternatively reducing interface pressure on the body of the user.

Other benefits and advantages of the present invention will become apparent in the specification hereof, and the scope of the invention will be expressed in the claims.

DETAILED DISCLOSURE

Figure 1:
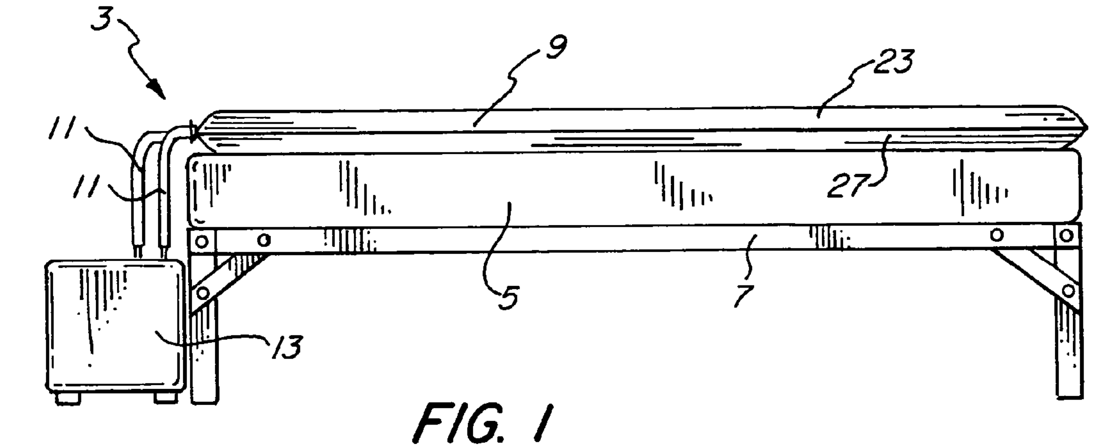
FIG. 1 shows a elevational view of a inflatable mattress system of the present invention in place on a bed.

As best seen in FIG. 1, the mattress system of the invention is generally indicated at 3. The mattress system 3 is preferably supported on a mattress 5 of conventional design which is usually supported on a frame or other structure 7. It will be understood, of course, that a variety of different bed frames can be used, particularly in the hospital or home care environment where this invention is especially useful.

The mattress system comprises an inflatable portion 9 which is connected by a plurality of hoses 11 to pump 13, which supplies air through the hoses 11 to inflate the inflatable portion 9.

Figure 2:
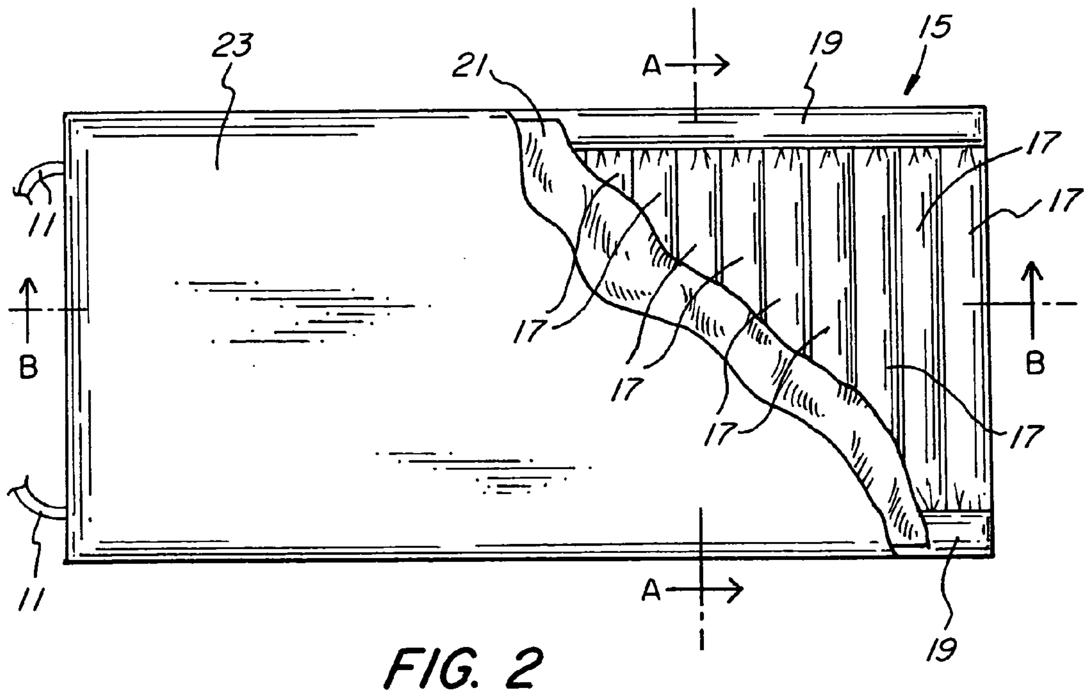
FIG. 2 shows a partly cut away plan view of the mattress of FIG. 1.

As best seen in FIG. 2, the inflatable portion 9 includes an inflatable mattress generally indicated at 15 which has a laterally middle portion that comprises a plurality of laterally extending, longitudinally spaced support tubes 17 over the entire length of the mattress. The air mattress also comprises first and second laterally longitudinal extending side rail tubes 19 which extend the entire length of the mattress adjacent the lateral ends of the support tubes 17 on either lateral side of the middle portion. Each of the tubes 17 and 19 is generally cylindrical in shape, with a diameter of approximately 4 inches.

The inflatable mattress is of material suitable for containing air under sufficient pressure to support a person on the inflatable portion 9. A variety of materials may be used effectively in this application, but the material is preferably a thermoplastic. Particularly preferred is polyethylene, such as the polyethylene material sold under the name "Metalecene" by Dow Chemical, Exxon or Mobil Corporation. The thickness of the polyethylene used may range from about 2 to about 25 mils, but particularly preferred is material of about 3 to 5 mils.

To provide for a breathable environment adjacent to the skin of a person lying on the inflatable portion 9, the mattress 15 is covered by a fill or batting layer 21 which extends over substantially all of the upper surface of the mattress 15 and is either glued or thermally bonded in place to the material of mattress 15. A top sheet or outer layer 23 covers the fill layer 21 and the entire upper surface of the mattress 15, and is bonded to the perimeter thereof, preferably by a thermal seal.

The top sheet 23 is formed of a breathable material that permits the passage of water vapor therethrough, but which does not permit liquid water to pass and is preferably bacteria-proof. Materials of this type are known in the disposable diaper arts. Particularly effective for this purpose is micropore material such as a polyester non wovens or polypropylene saturate material. The top sheet 23 permits water vapor from the perspiration of the person on the mattress 9 to pass through it and enter into the fill layer 21.

The main purpose of the fill layer 21 is to provide loft to create an air space between the top sheet 23 and the non-breathable material of the mattress 15 through which the user's water vapor can escape and then pass out of the system through the top layer 23 in a location where this will not cause discomfort to the user. Fill layer 21 is consequently of material that allows air and water vapor to pass therethrough fairly freely, and that resists retaining much moisture. Particularly preferred materials are polyester fill, and especially preferred is Dacron. Also, generally speaking, the mechanical nature of the fill layer material is such that it is less compressible than the underlying inflated mattress 15, so that the tubes 17 and 19 compress before the fill layer 21, and the loft thereof is maintained despite the weight of the patient pressing the fill layer 21 against mattress 15.

The top sheet 23 is an integral structural part of the inflatable portion 9. The fact that the top sheet 23 is bonded to the mattress substantially completely around its outer edge perimeter structurally ties the top sheet into the load bearing of supporting the user. The thickness of the top sheet 23 protects the mattress 15, and allows thinner material to be used in the mattress because it is protected better against puncture by the top sheet 23.

Figure 4:
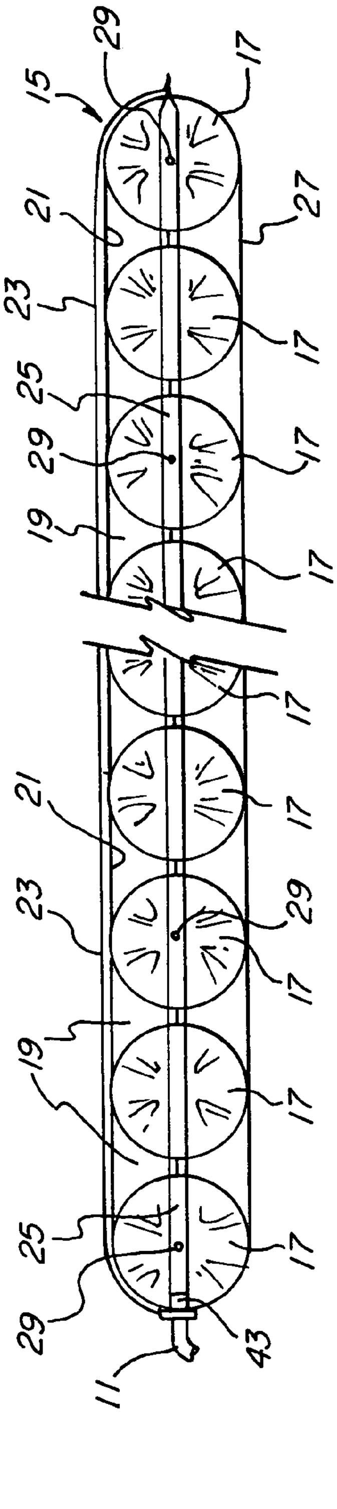
FIG. 4 shows a cross sectional view of the mattress system of FIG. 2 taken through line B-B.

Also, as best seen in FIG. 4, the top sheet 23 and fill layer 21 overlie the support tubes 17 and depend between the adjacent peaks of the tubes 17. When the user lies on the top sheet 23, the top sheet 23 and fill layer 21 together act to "tent" between adjacent support tubes 17, providing a more supportive flat surface on the top of the mattress portion 9.

The mattress portion 9 is also provided with a protective bottom sheet 27 of a durable material, with heavy polyester non woven material being especially desirable. This bottom sheet 27 protects the air mattress from being punctured from below. The bottom sheet 27, like the top sheet 23, is bonded to the mattress 15 around virtually all of the outer perimeter edge of the mattress 15, preferably in the same heat seal as is used to bond the top sheet 23 to the mattress 15. Bottom sheet 27 also cooperates structurally with the mattress 15 to provide a flat and stable support surface of the mattress portion 9 for the user to lie on.

To inflate and maintain pressure in the mattress 15, electrically powered pump 13 supplies air under pressure through hoses 11, which air flows into mattress 15 and inflates the support tubes 17 and the side rail tubes 19. The hoses 11 are connected with longitudinally extending air tubes 25 which define passages therein that communicate with support tubes 17 and transmit the air supplied by the pump 13 thereto.

Figure 3:
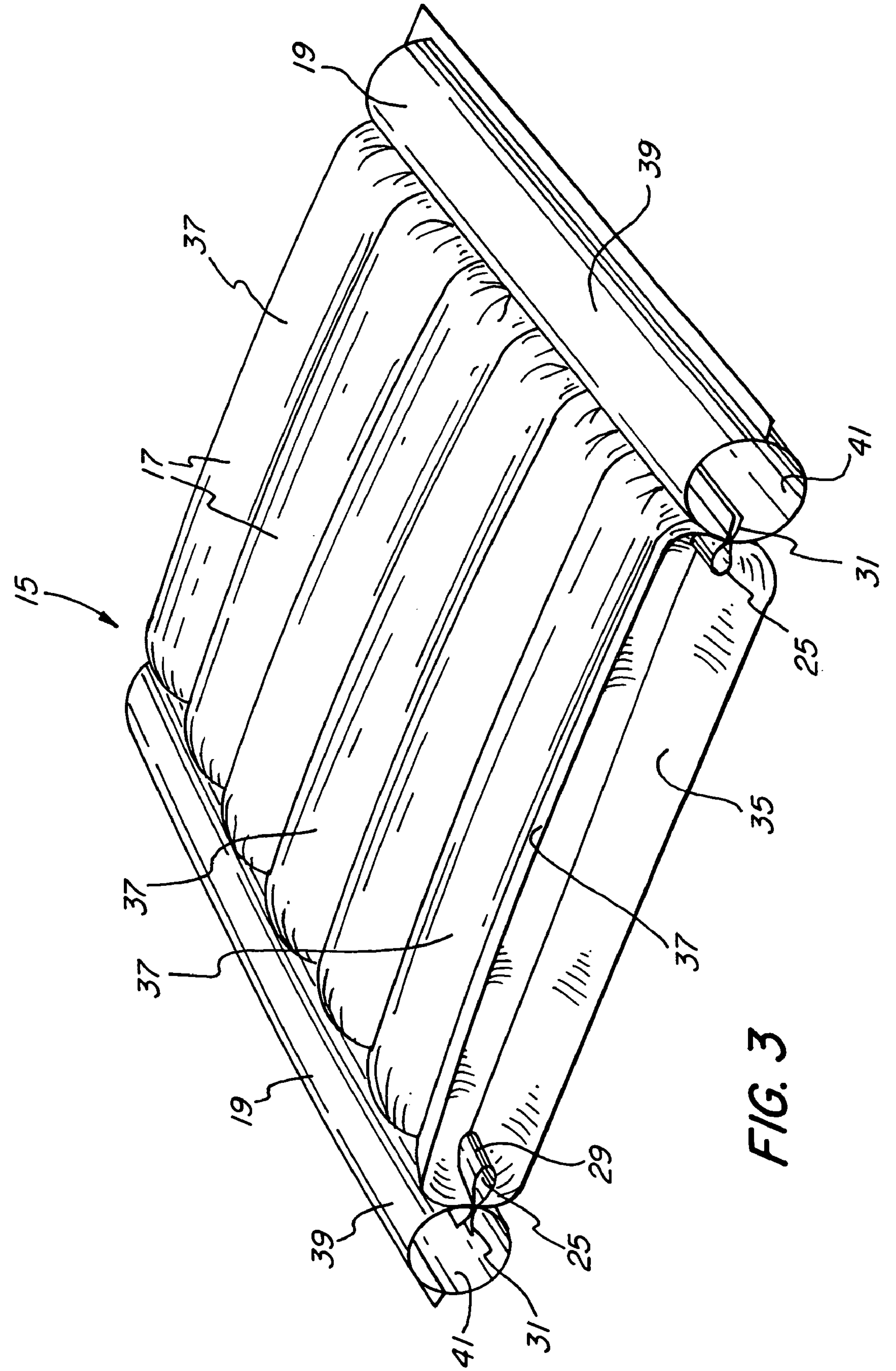
FIG. 3 shows a sectional perspective view taken through line A-A of FIG. 2.

In the preferred embodiment, as best seen in FIGS. 3 and 4, the passages in the air supply tubes 25 extend longitudinally through the mattress 15 but in one tube 25 apertures 29 are provided which communicate with the interior of a set of the support tubes 17, and in the other tube 25, apertures 29 are provided which communicate with the remaining support tubes 17. In the embodiment shown in FIG. 4, one air supply tube supplies air to every other support tube 17, and the other air supply tube 25 supplies air to the other support tubes 17 between them. Such an arrangement affords some degree of extra reliability, because, in the event that there is a failure of air supply or a tear in a support tube 17 of one of the sets of support tubes, the other set of support tubes 17 should still retain air pressure to support the user.

Alternatively, one air supply tube 25 may supply air to the first and last support tubes 17, defining with the side rail tubes 19 a rectangular frame, while the remaining longitudinally inward support tubes 17 are supplied with air by the other air supply tube 25. Also, if desired, additional air supply tubes 25 maybe added to the design to define other patterns of sets of support tubes 17 for special purposes.

In the most common application of the invention, the mattress is inflated fully and the user lies thereon, with the pump 13 activated only to the degree necessary to keep the air mattress 15 inflated. Increased comfort may be afforded to the user by forming small holes in the upper surface of the mattress 15 so that air pumped into the mattress can flow out through the upper sheet 33 of the support tubes 17, and through the fill layer 21, to better ventilate the points of contact of the user's body with the mattress 15.

It is an alternative aspect of invention to provide for prevention of bed sores in patients who are required to stay in bed for long periods of time, and the arrangement wherein each air supply tube 25 supplies air to alternating support tubes 17 is especially appropriate for this purpose. In this application, pump 13 alternates supplying air to one of the hoses 11 with the other of the hoses 11. By switching the supply of air from one hose 11 to the other periodically, the user is alternately supported by the "odd numbered" support tubes 17 and then the "even numbered" support tubes 17. In such an application, it is preferable that the upper surface of the support tubes 17 be punctured to a small degree, e.g., in pinpricks, to allow the escape of air therethrough so that deflation occurs fairly readily in tubes that are not being sent air, and also to ventilate the locations under the patient. The resulting system allows for continuous variations in the location of support of the patient, which prevents the formation of bed sores.

As best seen in FIGS. 3 and 4, the air supply tubes 25 are on either side of the mattress 15, each adjacent a respective side rail tube 19. The passages in the air supply tubes 25 also deliver air to the adjacent side rail tube 19. The air passes from the air supply tube through a flutter valve 31 formed by the ends of the air supply tube material (FIG. 3). These ends are heat sealed together, but intermittently so that air can flow from the passage in air tubes 25 into the interior of the side rail 19. The flutter valves 31 are one way valves, and do not permit the air to flow back in the reverse direction, i.e. from the side rail into the air tube 25.

The flutter valves 31 retain pressure in the side rails 19 even if the pump completely fails or if the support tubes 17 in the lateral middle of the mattress 15 completely deflate. This is especially advantageous in a hospital situation, because the side rails 19, while still inflated, will keep a patient from simply rolling out of bed in the event the mattress 15 partially deflates.

The method of fabrication of the air mattress 15 is also a particularly desirable aspect of the present invention because the mattress is constructed as a continuous sheet of bonded materials. The process of manufacture is schematically explained in FIG. 5. It will be understood that, while one side rail construction is shown, an equivalent symmetrical construction is applied on the opposite lateral side of mattress 15.

The first step in fabrication of the mattress 15 is that two sheets 33 and 35, which will become the upper and lower halves of the support tubes 17, are bonded together with the folded air tube sheet 37, which will become the air supply tube 25, by laterally extending heat seals. Sheet 37 is already provided with punched holes 29 therein before being sealed in place.

The heat seals are applied every 4 inches along sheet 37, because that will be the diameter of the support tube 17 when inflated. However, the relative lengths of top and bottom tube sheets 33 and 35 bonded to a 4-inch length of the folded air tube sheet 37 is greater, because the support tubes will inflate to a larger diameter. Therefore, these heat seals are applied with pleats or gussets folded into the sheets 33 and 35 to allow them to swell to a cylindrical shape without distorting the air supply tube 25.

The heat seal bonds sheets 33 and 35 to the outside face of sheet 37, but does not bond the inside faces of sheet 37 to each other. The interior passage defined by sheet 37 is kept open to allow air to flow down the resulting tube 25. Heat sealing on the inside of the tube is prevented by the use of a Teflon or paper insert, which will not permit the sheet 37 to heat seal to itself. Alternatively, ink may be used on the inside of the folded sheet 37, which will also prevent the heat seal from closing the interior of the tube 25.

Figure 5:
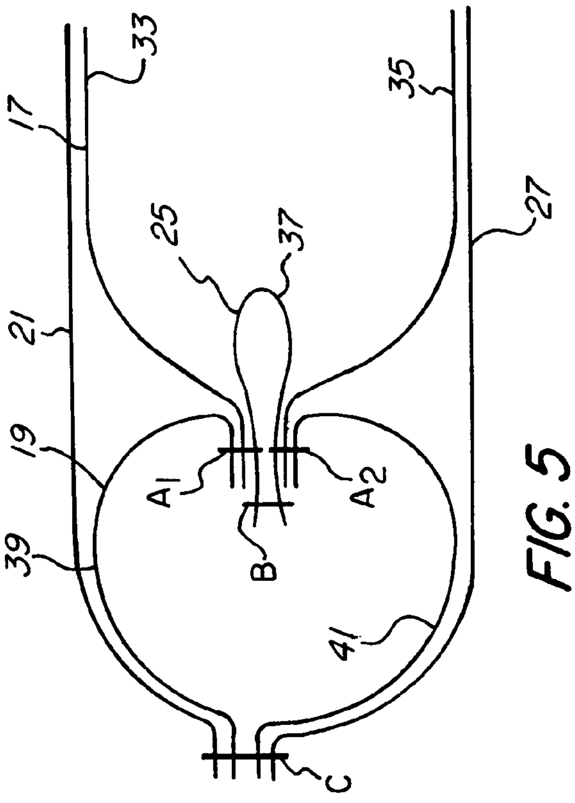
FIG. 5 shows schematically a heat sealing process for the construction of an air mattress of the invention.

Once this basic structure is formed, the remaining heat seals are longitudinal, and are illustrated in FIG. 5. First, heat seals A1 and A2 are applied, bonding support tube sheet 33 with part of air tube sheet 37 and a side rail top sheet 39, and bonding support tube sheet 35 with another part of sheet 37 and side rail bottom sheet 41. Second, heat seal B is applied to form the flutter valve on the air supply tube 25. This seal B is not continuous, but has gaps therein which will allow air to flow through between the two parts of the sheet 37 into the side rail 19. Thirdly, the outer edge of the side rail sheets 39 and 41 are heat sealed together by seal C, preferably also sealing the edge simultaneously with top sheet 23 and bottom cover sheet 27. The fill layer 21 must be installed below top layer 23 before seal C, or, if the batting material is compatible, the fill layer 21 may also be heat sealed along the outer edge of the mattress 15 together with top sheet 23.

This fabrication process produces a continuous roll of mattress material. To make an individual mattress therefrom, the manufacturer cuts the roll material in a lateral cut to a length suitable for a mattress. At one end of the cut material, the manufacturer heat seals the open ends of the side rails 19 and the air supply tube 25. At the other end, the manufacturer heat seals the open ends of the side rails 19, but inserts hose fixtures 43 into the open ends of air supply tubes 25 to allow the tubes 11 to pump 13 to be attached thereto. The mattress is then ready to use.

Figure 6:
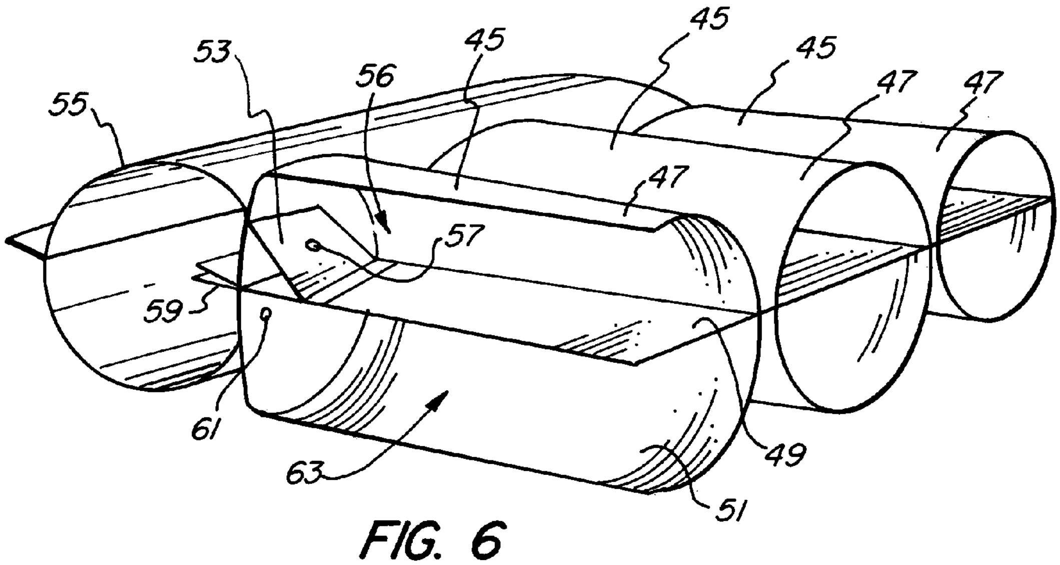
FIG. 6 shows a perspective view of an alternate embodiment of a mattress of the invention cutaway along both a longitudinal and lateral plane.

An alternate embodiment of the mattress of the invention is shown in FIG. 6, which shares many features with the preferred embodiment. In the alternate embodiment, support tubes 45 are formed of a support tube top sheet 47, a center sheet 49, and a bottom sheet 51. A longitudinally extending air supply tube structure 53 is provided adjacent each side rail 55. This air supply tube 53 supplies air into the upper support tube interior indicated at 56 through aperture 57 and into side rail 55 through flutter valve 59. The air supply tubes 53 preferably communicate with alternating support tubes as in the preferred embodiment.

Side rails 55 have apertures 61 therein which communicate with the lower support tube interior of all of the support tubes 45, indicated at 63. Because of one-way flutter valve 59, the air in the lower interior 63 and in the side rails 55 remains pressurized even if the pump 13 fails or the top interior 56 deflates. In such an event, the lower half of the support tubes 45 continues to support the user above the mattress below.

Figure 7:
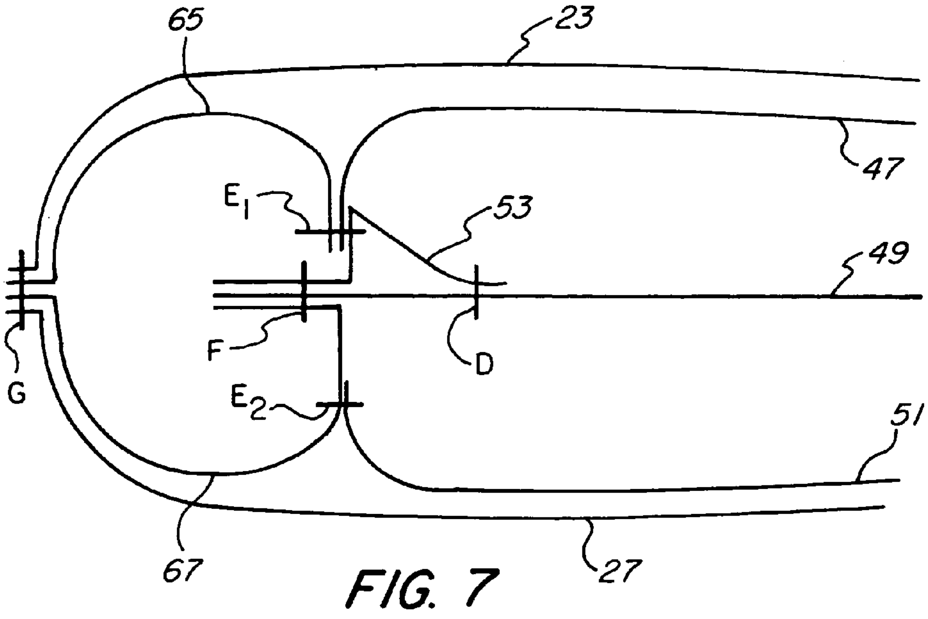
FIG. 7 shows schematically a heat sealing procedure for construction of the air mattress of FIG. 6.

Manufacture of such a mattress is similar to the process described above, with certain adjustments to allow for the presence of the center sheet 49. Referring to FIG. 7, in fabrication, a longitudinal heat seal D is made sealing air supply structure 53 to center sheet 49. Then lateral heat seals (not shown) are applied in a manner similar to that in the preferred embodiment, i.e., with the material of top and bottom sheets 47 and 51 gusseted to allow for inflation. Heat seals $E_1$ and $E_2$ join the support tube top sheet 47 with side rail top sheet 65, and join support tube bottom sheet 51 with side rail bottom sheet 67. Intermittent seal F is applied to create flutter valve 59 leading into side rail 55. Side rail 55 is then closed by sealing the lateral outward edge thereof, together with top sheet 23, bottom sheet 27, and, optionally, fill layer 21, which may be sealed in the same operation if the materials are compatible.

Both the preferred embodiment and the first alternate embodiment provide for an inflatable air mattress system about 4-inches thick, the radius of the support tubes 17. Such an air mattress is suitable for use where there is another mattress on the bed, but if no mattress is available, the 4-inch thick arrangement may not be adequately comfortable for the user. Accordingly, it may be desired to increase the thickness of the mattress.

Figure 8:
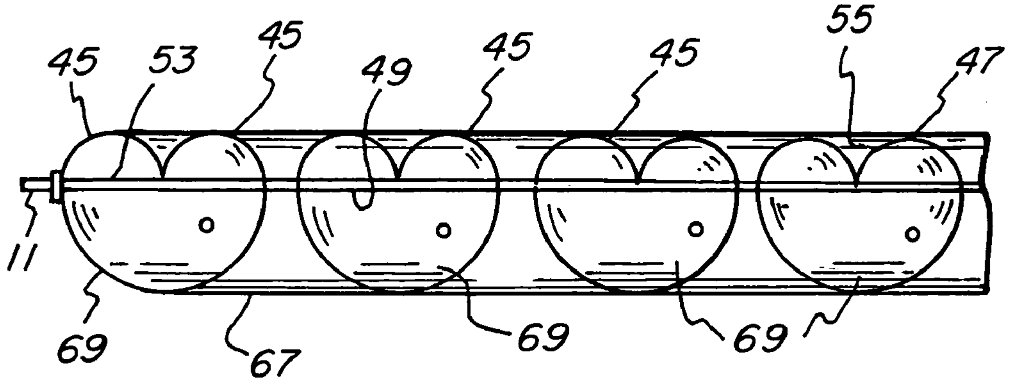
FIG. 8 is a longitudinal cross sectional view of an alternate embodiment of the mattress shown in FIG. 6.

Increasing the thickness of the mattress is possible using the structure of the alternate embodiment having the center sheet 49. As best seen in FIG. 8, a view showing a longitudinal cross-section of further alternate embodiment, the mattress may be thickened by providing underneath center sheet 49 enlarged support tubes 69, which have a diameter approximately twice that of the upper support tubes 45. The lower wall of the side rail 55 is also extended to increase this dimension below the center sheet 49. This design provides for an additional 2 inches of thickness in the mattress.

Figure 9:
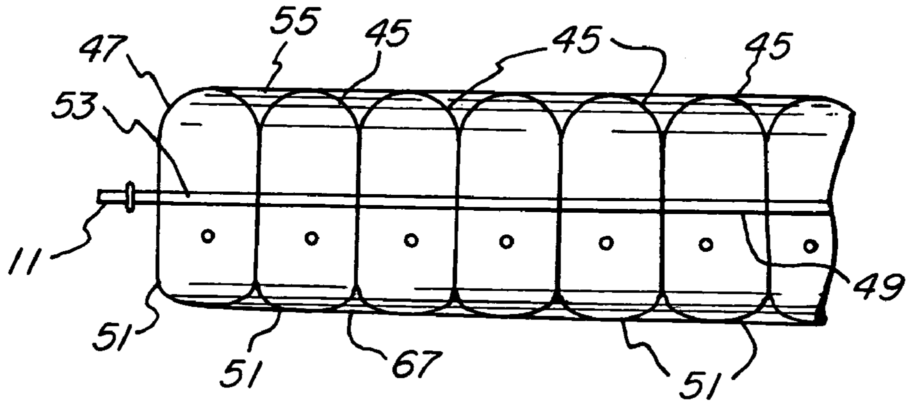
FIG. 9 is a longitudinal cross sectional view of a further alternative embodiment of the air mattress shown in FIG. 6.

FIG. 9 shows an alternate embodiment wherein the upper and lower support tubes 45 are extended by producing longer amounts of material in the sheet 47 and 51 as gusseted, so that the inflated tube expands to a greater height. The side rails 55 are similarly provided with additional material for increased height of the mattress.

Where no mattress is provided for the bed, and all support of the user is to be provided by an inflated air mattress, it is generally preferred, particularly in hospital and home-care environments, that a mattress of at least 8 inches in height be provided.

Figure 10:
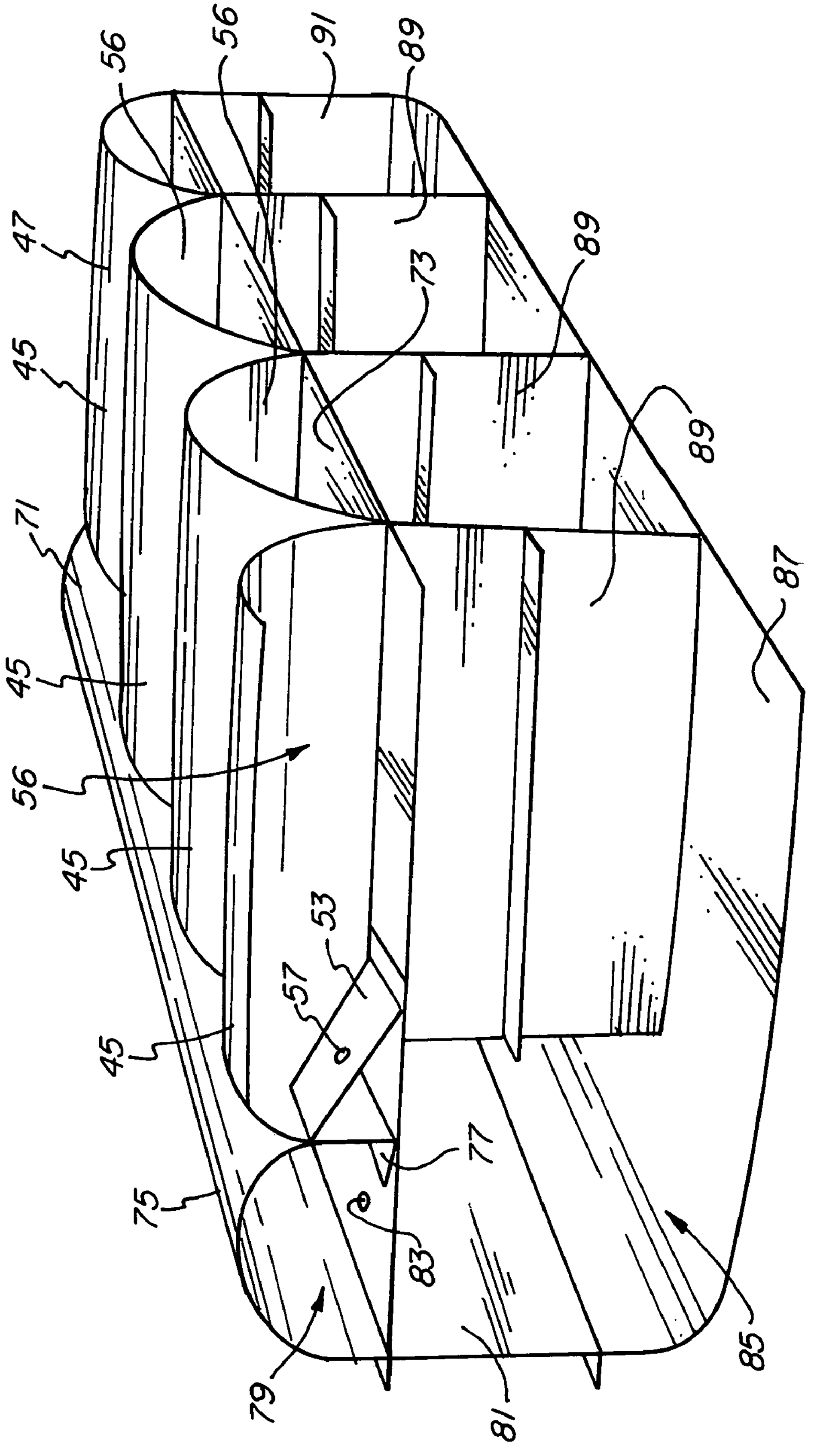
FIG. 10 is a perspective view of an alternate embodiment of air mattress according to the invention cutaway at longitudinal and lateral planes therethrough.
Figure 11:
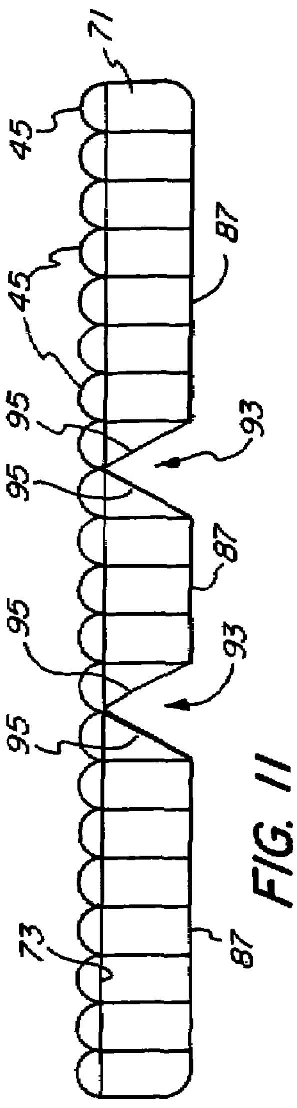
FIG. 11 is a longitudinal cross section taken through the mattress shown in FIG. 10.
Figure 12:
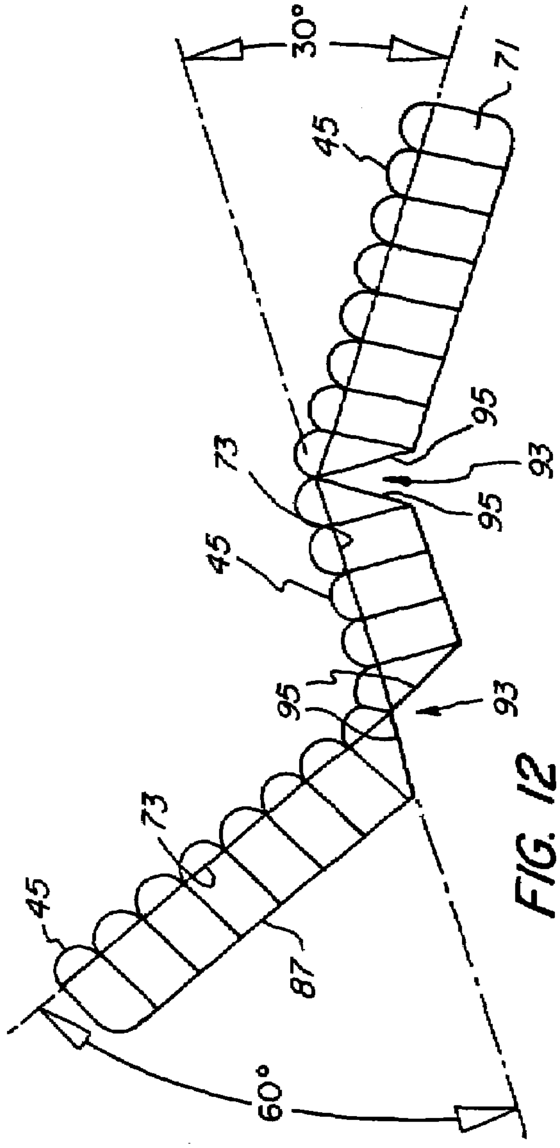
FIG. 12 is a schematic representation of the articulation provided by the mattress shown in FIGS. 10 and 11.

FIGS. 10 to 12 show an alternate embodiment which provides an inflated mattress of appropriate height according to the present invention. Many aspects of this structure are similar to those of the embodiment shown in FIGS. 6 and 7, and similar parts are given the same reference characters.

The upper surface of the air mattress 71 comprises a series of laterally extending support tubes 45 having a diameter of approximately 4 inches. These support tubes 45 are formed of a sheet 47 secured to the upper surface of a center sheet 73, which extends substantially the entire length and lateral width of the mattress 71.

Air is supplied through air supply tubes defined by tube structure 53, which is similar to that shown in the embodiment shown in FIG. 6. An aperture or punch hole 57 in the structure 53 allows air pumped therein to enter into the upper support tube interior space indicated at 56. A side rail 75 is provided on each lateral side of the mattress 71. Flutter valve structure 77 permits air in the passage 53 to also pass into upper side rail interior space 79.

Center sheet 73 extends below the upper side rail 75 to outer wall 81 of the air mattress 71 and is secured thereto. For distribution of air, center sheet 73 is provided in the region of the side rail 75 with a plurality of apertures or punch holes 83 through which air may pass from the interior space 79 of the side rail 75 down into a lower interior space generally indicated at 85, in the air mattress 71. The lower space 85 of the air mattress 71 is defined by the cover sheet 73, the side wall 81, a bottom enclosure sheet 87. In order to support the upper surface tubes 45 of the mattress so that there is not an undue amount of lateral or longitudinal movement possible, a plurality of support panels 89 are provided linking the bottom closure sheet 87 with the center sheet 73. At the longitudinal ends of the mattress the panel is extended to seal against the side wall 81, to fully enclose the lower space.

In the event of a failure of the pump 13, which supplies air to the air supply passage 53, or in the event of a rupture of the upper surface of the mattress causing deflation of support tubes 45, the side rail 75 remains inflated due to the one-way passage of air in flutter valve 77, which prevents air in the side rail interior space 79 from passing back into the air supply passage 53. Furthermore, because side rail space 79 communicates with the lower space 85 of the mattress through aperture 83, air in the lower space 85 also is prevented from leaving.

As a consequence, in the event of a failure of the pump 13 or the upper support tubes 45, the mattress 71 will still retain air therein, and the patient will lie on a flat surface defined by cover sheet 73, supported on inflated lower space 85, and between inflated side rails 75 which will also remain inflated. This of course is especially important where the inflatable mattress is used on a bare surface or bedspring, to prevent a rupture from dropping onto an uncomfortable surface below the mattress 71.

Where the mattress 71 is used in an environment with a bed with some articulation, such as a hospital or home-care bed, the thickness of the mattress 71 does not admit to easy folding. Accordingly, as best shown in FIGS. 11 and 12, the bottom sheet 87 and the side walls 81 are interrupted in two locations to create an articulating recess generally indicated at 93. At these recesses, the lower surface sheet 87 extends up to center sheet 73, as a sloping bottom wall 95 on either side of the recess 93, which allows substantial bending movement, as seen in FIG. 12.

Construction of the mattress 71 of this alternate embodiment with respect to the top portion of the air mattress 71, i.e., that portion that is above the center sheet 73, is accomplished using methods similar to those described with respect to the embodiment shown in FIGS. 6 and 7. The lower portion, i.e., the side and bottom walls 81, 87 and the support panels 89 and end walls 91, are assembled by a process which should be apparent to those knowledgeable in the art.

The foregoing specification has been couched in terms which should be viewed as descriptive rather than limiting, as those with skill in the art, having this specification before them, will be able to make modifications and variations to the structure thereof without departing from the scope of the invention here disclosed.

What is claimed is:

1. A method of manufacturing an inflatable air cushion, said method comprising the steps of:

forming a generally longitudinally continuous cushion precursor stock of a substantially airtight material, said stock including a series of longitudinally spaced laterally extending support tubes each having two lateral ends and an interior, a pair of longitudinally extending side tubes each adjacent to a respective set of said lateral ends of said support tubes, and each being generally co-planar with said support tubes;

cutting said precursor stock at a location suitable for the length of the inflatable cushion;

sealing longitudinal ends of the said side tubes so that air does not escape therefrom when the cushion is inflated; and wherein said precursor stock is formed to include a first passage structure defining a first continuous longitudinally extending passage in the stock communicating with an interior of some of said support tubes, and a second passage structure defining a second continuous longitudinally extending passage in the stock communicating with others of said support tubes.

2. The method of claim 1, and sealing said first and second passages closed to permit inflation therewith.

3. The method of claim 1, and inserting into said first and second passages fixtures adapted to connect with hoses supplying air to said passages for inflating the cushion.

4. The method of claim 1, and said forming of said precursor stock including bonding first and second sheets of airtight material together with laterally extending seals to form said support tubes.

5. The method of claim 4, and said passage structures defining said longitudinally extending passages to extend through said seals without interruption.

6. The method of claim 5, and said longitudinally extending passages being kept open through said seals by an insert placed therein during forming of the seals or by coating a surface of the structure defining the passage with a substance, such as ink, to prevent bonding therein during the forming of the seals.

7. The method of claim 1, and said forming of the stock including applying a fill sheet over said support tubes and a top sheet extending thereabove, said top sheet being bonded to at least a portion of a perimeter of the air cushion, and being of a water vapor permeable, and liquid water impermeable sheet material.

8. The method of claim 1, and one of said passages communicating with a first subset of said support tubes and the other of said passages communicating with a second subset of said support tubes.

9. The method of claim 1, and wherein said cushion comprises a mattress.

10. A method of manufacturing an inflatable air cushion, said method comprising the steps of:

forming a generally longitudinally continuous cushion precursor stock of a substantially airtight material, said stock including a series of longitudinally spaced laterally extending support tubes each having two lateral ends and an interior and a plurality of pleats or gussets folded into said precursor stock so as to allow each of the support tubes to swell into a generally cylindrical shape, a pair of longitudinally extending side tubes each adjacent to a respective set of said lateral ends of said support tubes, and each being generally co-planar with said support tubes;

cutting said precursor stock at a location suitable for the length of the inflatable cushion; and sealing longitudinal ends of the said side tubes so that air does not escape therefrom when the cushion is inflated.

11. The method of claim 10, and wherein said precursor stock is formed to include a first passage structure defining a first continuous longitudinally extending passage in the stock communicating with an interior of some of said support tubes, and a second passage structure defining a second continuous longitudinally extending passage in the stock communicating with others of said support tubes; and said method further comprising sealing said first and second passages closed to permit inflation therewith.

12. The method of claim 11, and inserting into said first and second passages fixtures adapted to connect with hoses supplying air to said passages for inflating the cushion.

13. The method of claim 11, and said forming of said precursor stock including bonding first and second sheets of airtight material together with laterally extending seals to form said support tubes.

14. The method of claim 13, and said passage structures defining said longitudinally extending passages to extend through said seals without interruption.

15. The method of claim 14, and said longitudinally extending passages being kept open through said seals by an insert placed therein during forming of the seals or by coating a surface of the structure defining the passage with a substance, such as ink, to prevent bonding therein during the forming of the seals.

16. The method of claim 10, and said forming of the stock including applying a fill sheet over said support tubes and a top sheet extending thereabove, said top sheet being bonded to at least a portion of a perimeter of the air cushion, and being of a water vapor permeable, and liquid water impermeable sheet material.

17. The method of claim 11, and one of said passages communicating with a first subset of said support tubes and the other of said passages communicating with a second subset of said support tubes.

18. The method of claim 10, and wherein said cushion comprises a mattress.

* * * * *